United States Patent
Oh et al.

(10) Patent No.: US 7,836,319 B2
(45) Date of Patent: Nov. 16, 2010

(54) CONTROLLING POWER SUPPLY TO A STORAGE DEVICE

(75) Inventors: Jang Geun Oh, Suwon-si (KR); Seo Kwang Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1081 days.

(21) Appl. No.: 11/459,234

(22) Filed: Jul. 21, 2006

(65) Prior Publication Data
US 2007/0025195 A1 Feb. 1, 2007

(30) Foreign Application Priority Data
Jul. 26, 2005 (KR) ............... 10-2005-0067675

(51) Int. Cl.
G06F 1/32 (2006.01)
G06F 13/10 (2006.01)

(52) U.S. Cl. ............ 713/323; 713/300; 713/310; 713/320; 713/321; 713/322; 713/324; 713/330; 713/340

(58) Field of Classification Search .......... 713/300, 713/310, 320–324, 330, 340
See application file for complete search history.

(56) References Cited

U.S. PATENT DOCUMENTS

| | | | |
|---|---|---|---|
| 6,067,628 A * | 5/2000 | Krithivas et al. ............ 713/340 |
| 6,226,237 B1 * | 5/2001 | Chan et al. .................. 710/14 |
| 6,591,368 B1 * | 7/2003 | Ryu ............................ 713/323 |
| 2001/0043528 A1 | 11/2001 | Sekiya | |
| 2002/0096626 A1 | 7/2002 | Ishizuka | |
| 2004/0117679 A1 * | 6/2004 | Kim .......................... 713/320 |
| 2005/0010828 A1 * | 1/2005 | Oh ............................. 713/300 |
| 2005/0044436 A1 * | 2/2005 | Holle ......................... 713/320 |
| 2006/0095797 A1 * | 5/2006 | Hung ......................... 713/300 |
| 2006/0129857 A1 * | 6/2006 | Liu et al. .................... 713/320 |

FOREIGN PATENT DOCUMENTS

| | | |
|---|---|---|
| GB | 2 408 839 | 6/2005 |
| JP | 09-262356 | 10/1997 |
| TW | 514896 B | 12/2002 |
| TW | 595203 B | 6/2004 |

OTHER PUBLICATIONS

Taiwan Search Report dated Jul. 17, 2009 for Application No. 095127395, 1 page.

* cited by examiner

Primary Examiner—Thomas Lee
Assistant Examiner—Fahmida Rahman
(74) Attorney, Agent, or Firm—Fish & Richardson P.C.

(57) ABSTRACT

A power control apparatus includes a driver for controlling an operation of a storage device, a filter driver for monitoring a state of the storage device, and a management program part for controlling a power supply to the storage device. The management program part is configured to output a control signal based upon the monitored state to a control part operatively connected to the storage device.

8 Claims, 10 Drawing Sheets

CONTROLLING POWER SUPPLY TO A STORAGE DEVICE

BACKGROUND

This description relates to power control for a storage device, such as an optical disk drive.

Recently, with the development of computers and multimedia devices, the amount of information processing and processing speeds are increasing. Accordingly, auxiliary storage and replaying devices, such as optical disk devices, are being developed that are economical, have a relatively large capacity, and which provide high-speed access.

An optical disk device (ODD) is a device for storage and/or replaying of an optical disk, such as a CD, DVD or other optical media. With the wide distribution of optical disks, the ODD is more commonly serving as a second or complementary system for a primary computer system to which the ODD may be connected.

In order to enhance the portability of a computer system such as a notebook computer, it is often important to decrease the size and weight of the computer system, such as by reducing the size of the battery, the optical disk device, and/or other peripheral devices or internal components.

Accordingly, the computer system often manages power by switching a peripheral device to a power-saving mode or a sleep mode to reduce system power demands and to ultimately reduce the size of the required battery for the system, such as a battery for a notebook computer.

SUMMARY

In one general aspect, power of a storage device may be controlled to reduce power dissipation and extend the lifespan of a battery by shutting off power to the storage device after a predetermined time period of inactivity.

In another general aspect, a power control apparatus includes a driver for controlling an operation of a storage device, a filter driver for monitoring a state of the storage device, and a management program part for controlling a power supply to the storage device. The management program part is configured to output a control signal based upon the monitored state to a control part operatively connected to the storage device.

Implementations may include one or more of the following features. For example, the control part may include an embedded controller operatively connected to the storage device and the management program part.

The apparatus may include the control part. The control part may be operatively connected to the storage device and the management program part. The control part may include a system bios part, which may be operatively connected with the control part and the management program part.

The storage device may include an ODD (optical disk device).

A switching part may be connected to the control part for controlling the power of the storage device.

The filter driver may be configured to monitor a signal transmitted between the storage device driver and an operating system.

The management program part may be configured to supply the control signal to turn power on to the storage device in response to an input of a predetermined key.

The control part may include at least one device for controlling a peripheral device selected from the group consisting of a south bridge, a hub chipset, and an embedded controller.

The storage device may include an eject button part configured to output a command for resuming the power supply to the storage device.

The control part and a switching device may be operatively connected to the storage device. The control part may provide a signal to the switching device to shut-off the power supply to the storage device.

In another general aspect, controlling a power supply to a storage device includes controlling an operation of a storage device having a storage device driver, monitoring a state of the storage device with a filter driver, and controlling a power supply to the storage device with a control signal and based on the monitored state of the storage device. The control of the power supply with the control signal includes providing the control signal to a switching device to shut off the power supply to the storage device or to resume the power supply depending upon the monitored state.

Implementations may include one or more of the following features. For example, the control signal may be provided to the switching device to shut off the power supply to the storage device in response to detecting a period of inactivity of the storage device, in response to an input of a predetermined key, and/or in response to an operation of the storage device. The operation of the storage device may be an operation of the eject button of the storage device.

The power state information of the storage device may be set to a power-off state with the storage device driver.

An auto run function may be turned off to prevent monitoring of the storage device.

In another general aspect, a power control apparatus includes a storage device driver for controlling an operation of a storage device, a management program part for controlling a power supply to the storage device by outputting a control signal to a control part operatively connected to the storage device, and
   a filter driver for monitoring a state of the storage device and operatively connected to the management program part. The filter driver is configured for transmitting the monitored state of the storage device to the management program part.

The management program part may be configured for setting the state of the storage device to a power-off state in response to a period of inactivity of the storage device.

The apparatus may further include the storage device and the control part. The storage device may be an optical disk drive.

In another general aspect, an apparatus for controlling power of a storage device includes a power supply, an optical disk device driver for controlling an operation of an optical disk device; and a switch connected between the power supply and the optical disk device driver. The switch is turned on and off in response to an external control signal to thereby perform on and off operation of the power supplied to the ODD driver.

Implementations may include one or more of the following features. For example, the apparatus may include an eject button part for outputting an interrupt signal to supply power to the optical disk device in a power-off state.

In another general aspect, an apparatus for controlling power of a storage device based on an operation state of the storage device includes an optical disk device driver configured for performing an operation or control of the storage device, an operating system configured for recognizing the storage device even when power of the storage device is off, a monitoring and managing unit operatively connected to the optical disk device driver and the operating system, and configured to monitor the state of the storage device and to output a control command for controlling power of the storage device, and a control unit for controlling the power of the storage device according to the control command.

Implementations may include one or more of the following features. For example, the monitoring and managing unit may include a filter driver connected to the driver and the operating system and configured to monitor the state of the storage device, and a management program unit configured to output the control command to be input to the control unit so as to control the power according to the monitored state of the storage device.

The power state of the storage device may be set to a power-off state before the power of the storage device is cut off.

The filter driver may be configured to transmit information indicative of system termination or a power-off state of the driver of the storage device.

The filter driver may be configured to output mode information of the storage device, and the operating system may be configured to recognize the storage device as being in an idle state in response to the mode information.

In another general aspect, controlling power of a storage device connected to a system includes monitoring an operation state of the storage device, setting the storage device to a power-off state based on information indicative of system termination or a power-off control information, and shutting off the power to the storage device.

Implementations may include one or more of the following features. For example, the operating system may recognize a power state of the storage device as the power-off state. A polling operation monitoring the storage device may be interrupted by the operating system.

Power may be supplied to the storage device based on an input of a specific key or an operation of a specific part of the storage device. The specific key may include a separate hot key for power control, or a combination of existing keys.

The operation of the specific part may include an input of an eject key of the storage device or an operation of a tray of the storage device.

In another general aspect, controlling power of a system including a storage device includes monitoring an operating state of the storage device, setting the storage device to a power-off state if the storage device is idle for more than a predetermined time period, and interrupting a polling operation of the operating system for detecting the storage device. The power of the storage device is shut off and an input of a specific key or an operation of a specific part is detected. Power is supplied to the storage device based on the detected input or the detected operation.

Other features will be apparent from the following description, including the drawings, and the claims.

DETAILED DESCRIPTION

In general, the same reference numbers will be used throughout the drawings to refer to the same or like parts.

A conventional computer system may be configured to periodically check the use of the ODD so as to efficiently control the power of the ODD. A timer may be used to determine whether the ODD is used during a predetermined time period. If the ODD has not been used during the time period, the system operates in a power-saving mode or a sleep mode in which power supplied to the ODD can be reduced to a minimum. If the use of the ODD is detected while the timer is operating, the timer is reset and restarted from a time point when the operation of the ODD is stopped. If the ODD needs to be used while in the power-saving mode or the sleep mode, the system returns the ODD to a normal mode and allows the user to use the ODD.

One type of power saving effect includes supplying a relatively low power to the ODD, or other storage and replaying device, that is in a power-saving or sleep mode so as to operate the device in a standby state. However, even in the power-saving mode or the sleep mode, power at the level associated with the mode is continuously supplied from the system and the ODD dissipates power while in the standby state. The computer system may also dissipate more power as a result, thereby reducing the operating time and available battery power.

Power states D0 and D3, which will be described in greater detail below, refer to an operational state of the device (D0) and a non-operating state of the device (D3). In operating state D0, a device is on and running, receiving full power from the system, and performing the associated system functions. In operating state D3, a device is off and not running.

Figure 1:
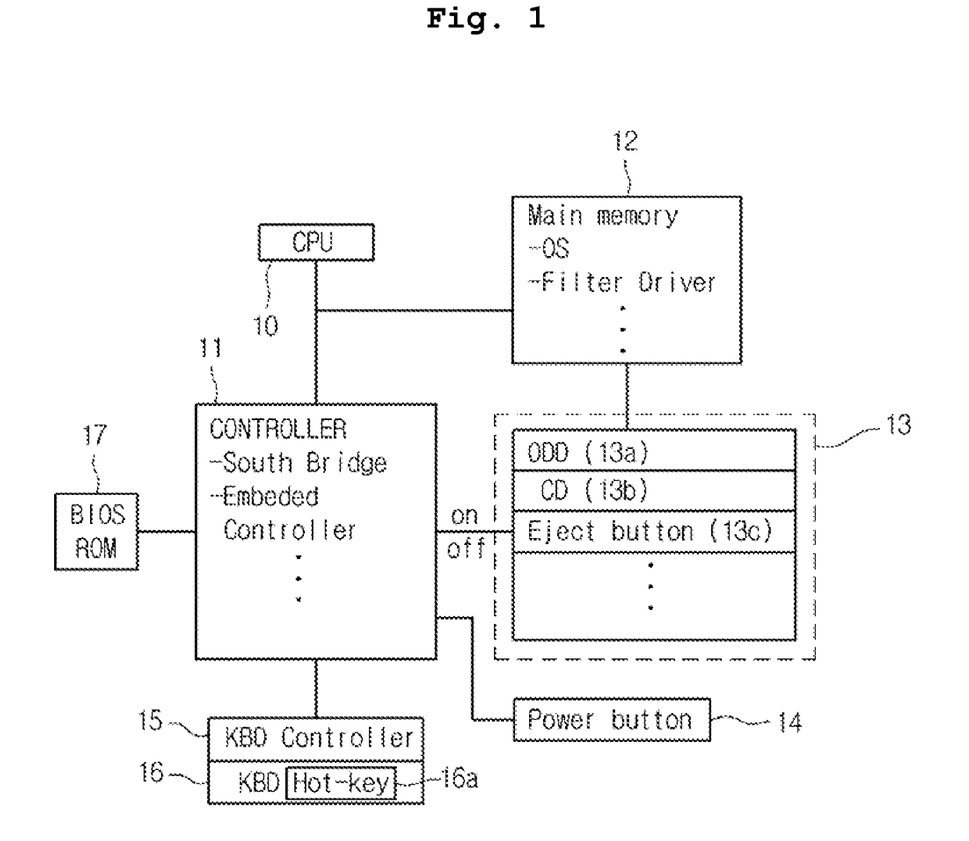
FIG. 1 is a block diagram of a computer system to which a general auxiliary device is connected.

Referring to FIG. 1, a CPU 10 controls an overall operation of the system. A controller 11 is connected to the CPU 10 and performs a system memory bus input and output control function and/or a peripheral device input and output function. A memory device 12 stores an operating system (OS) program and/or a program that monitors an operation state of a peripheral device 13, which may be a storage and replaying device, and controls the power of the device. The peripheral device 13 is controlled by the controller 11 and includes an optical storage device, such as an ODD 13a or a CD 13b, and also includes an eject button 13c. A BIOS ROM 17 stores a program that controls a fundamental operation of the system.

Also, the computer system includes a keyboard 16 having a hotkey 16a, a keyboard controller 15 for controlling the keyboard 16, and a power button 14. The keyboard 16 is an input device that interrupts a preset operation, such as an operation of restarting the ODD.

Figure 2:
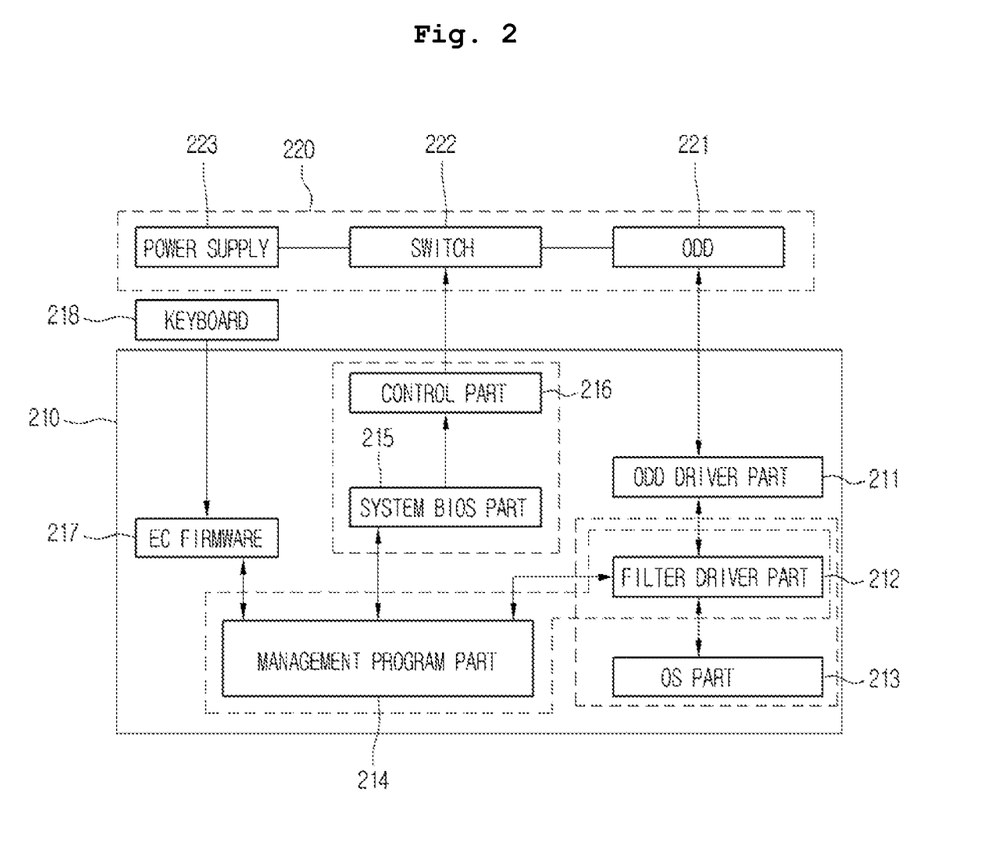
FIG. 2 is a block diagram of an apparatus for controlling the power of an Optical Disk Device (ODD).

Referring to FIG. 2, a peripheral device includes an ODD/power part 220 connected to a computer system 210, and a keyboard 218. The keyboard 218 is an input device for the computer system 210, and the ODD 221 represents an optical disk device, such as an ODD for playing CDs.

The ODD/power part 220 includes a power supply 223 having a power rail for supplying power to the peripheral device, an ODD 221 that performs an optical disk storage or replaying function, and a switch 222 that allows the cutting-off of power between the power supply 223 and the ODD 221. Although the power supply 223 and the switch 222 are shown as being integral with and part of the ODD/power part 220, the power supply 223 and the switch 222 can be separately configured inside the system 210. Various components of the system are shown as monolithic devices. However, it will be appreciated that one or more of the individual components may be provided as separate components or peripheral devices external to and operatively connected with a main system.

In an exemplary system, the switch 222 may be a field effect transistor (FET) switching element. The computer system 210 includes an ODD driver 211, an OS part 213, a filter driver part 212, a management program part 214, a system BIOS part 215, a control part 216, and an embedded controller (EC) firmware part 217. The ODD driver 211 operates to recognize the ODD 221 for the power control of the ODD/power part 220. The OS part 213 operates the computer system 210. The filter driver part 212 monitors the operation state of the ODD 221 through message hooking between the ODD driver part 211 and the OS part 213. The management program part 214 controls the power according to the operation state of the ODD 221, which is monitored by the filter driver part 212. The system BIOS part 215 is provided for the initial and fundamental operations of the computer system 210.

The control part 216 controls a peripheral device, such as the ODD 221. The EC firmware part 217 controls an operation of an embedded device. The OS part 213 may be an operating system, such as Windows XP® available from Microsoft Corporation. The filter driver 212 and the management program part 214 can also be implemented as a single program.

The overall operations of monitoring and power management can be performed using an application program called a battery miser. The battery miser is a type of program that provides the power-saving features for a computer. The program acts as a power supply manager that controls all the power settings for the monitor, processor, HDD, and other devices operatively connected to the system, which allows the ODD operation state and system power control to be monitored or controlled using a single program.

Exemplary methods of monitoring the ODD operation states include one or more of the following. In a first method, a sensor detects whether a tray of the ODD 221 is opened or closed, and the operation state of the ODD can be monitored using the corresponding output information. In a second method, the operation state of the ODD 221 can be monitored by detecting whether data input and output of the ODD is achieved within a preset time period. In a third method, the operation state of the ODD 221 can be monitored by detecting whether the eject key of the ODD is operated or not. The ODD driver part 211 checks the ODD state, the OS of the computer system 210 recognizes the ODD 221, and the ODD 221 is driven.

The filter driver part 212 monitors the operation state of the ODD 221 by hooking the information input to or output from the ODD 221 between the OS part 213 and the ODD driver part 211. If the state of the ODD 221 changes, the filter driver 212 may transmit the corresponding information to the management program 214. The management program 214 is one application program installed in the computer system 210 which outputs control information for controlling the power according to the ODD state transmitted from the filter driver 212. The filter driver part 212 may also be implemented inside the OS part 213.

The system BIOS part 215 performs a fundamental operation when booting the computer system 210, and the control part 216 controls the operation of the peripheral device. The control part 216 includes a south bridge and is connected to the power control switch 222 of the ODD 221 to control the operation of the peripheral device. The system BIOS system part 215 and the control part 216 can also be implemented in a single chipset.

The keyboard 218 is an input device for the computer system 210, and may include a hotkey (16a in FIG. 1) that allows the ODD 221 to operate. By pressing the hotkey of the keyboard 218, power can be supplied to reactivate an ODD 221 initially in a power-off state. The pressing of the hotkey can allow the tray of the ODD 221 to be ejected automatically. The power of the ODD 221 can be turned on in response to the selection of the hotkey. After the power-on, the tray can be ejected using the eject key of the ODD 221.

In addition, or in the alternative, the ODD can be operated using a combination of existing keys, e.g., Fn+F2, as the operation of the hotkey. The keyboard 218 is connected to the EC firmware 217 and detects the input of the hotkey. The management program part 214 outputs a control command to the filter driver part 212 so as to control the power of the ODD 221 according to the detected hotkey.

In a first exemplary operation, the message transmitted between the ODD driver part 211 and the OS part 213 of the computer system 210 is hooked, and the filter driver 212 monitors the operation state of the ODD 221. The corresponding state information is transmitted by the filter driver 212 to the management program part 214.

The management program part 214 determines whether the ODD 221 has been used for a predetermined time. If the ODD 221 has not been used for the predetermined time, the management program part 214 requests the powering-off of the ODD 221 through the system BIOS part 215. The system BIOS part 215 transmits the control information instructing the powering-off of the ODD 221 to the control part 216 in response to the request from the management program part 214.

The control part 216 outputs the control information to operate the switch 222 of the ODD 221. The switch 222 operates to disconnect the power supply 223 from the ODD 221 according to the control information, thereby cutting off the supply of the power.

Even though the power supply is shut off, the OS part 213 of the computer system 210 recognizes the ODD 221. Therefore, the presence of the ODD in the system can be exhibited in a display supported by a Windows-based operating system. Even when the power supplied to the ODD 221 is cut off, the filter driver part 212 is configured to turn the ODD driver part 211 on or off. Therefore, if the hotkey is selected, the ODD driver part 211 can be enabled to control the operation of the ODD 221.

The following exemplary operation is performed for the system OS to recognize the ODD 221 that is in a power-off state. If the ODD 221 does not operate for a predetermined time, the management program part 214 sends a request to cut off the ODD power to the system BIOS part 215.

The management program part 214 sets the ODD power state information of the ODD driver part 211 to "D3" through the filter driver 212. Accordingly, the cutting-off of the ODD power is performed after the ODD power state is set to D3, and the switch 222 is off after the ODD power state is set to D3.

Based on the afore-mentioned operation, the OS part 213 recognizes that the ODD 221 is continuously connected to the system. The OS part 213 continuously polls the ODD 221, such as through an automatic function of the operating system, to detect media within the ODD 221. If the switch is off, the ODD 221 recognizes the ODD 221 or media as being removed, and the ODD 221 does not appear as an active device within the operating system.

If the ODD power is shut off based on the ODD operation state without any action, the OS part 213 recognizes the ODD 221 as being completely removed from the system. The function of operating the ODD 221 by pressing the hotkey will not be available for later execution, and/or the ODD 221 does not appear on the operating system.

If the ODD power is shut off, the OS recognizes the ODD 221 as being released from the system based on the polling result for the device detection. Accordingly, the filter driver 212 outputs, for example, false information relating to system termination and/or a compulsory command of entry into the D3 state to the ODD driver 211 to improve power control in the aforementioned situations. In this manner, the ODD power state is set to D3, and the polling of the OS part 213 is normally stopped. Accordingly, the OS part 213 recognizes the ODD 221 as being continuously connected to the system.

In another implementation, an auto run off function of the OS may be used to stop the polling operation of the OS part 213. The power is shut off after the ODD power state is set to D3, so that the presence of the ODD 221 can still be verified by the OS part 213 that periodically polls the ODD that is in a shut-off state. If the ODD power state information is "D3," the OS part 213 recognizes the ODD 221 as being in the D3 state, which is the maximum power-saving state while being connected to the system.

Therefore, the OS part 213 of the computer system 210 continuously recognizes the ODD 221, even when the ODD 221 is completely shut off. Accordingly, in order to reuse the ODD 221, the user presses the hotkey defined in the keyboard 218 so as to supply the power to the ODD 221. If the hotkey is pressed, the EC firmware part 217 notifies the press of the hotkey to the management program. The management program part 214 requests the powering-on of the ODD 221 to the system BIOS part 215. The system BIOS part 216 manipulates the switch 222 through the control part 217, such that the power is supplied to the ODD 221.

If power is supplied to the ODD 221, the ODD 221 is initialized and set to a state in which the ODD 221 can operate normally. The management program part 214 sends the command of ejecting the tray of the ODD 221 to the ODD driver part 211 through the filter driver part 212 in response to or simultaneously with the initializing of the ODD 221. Accordingly, the power is supplied and the tray of the ODD 221 is ejected.

Figure 3:
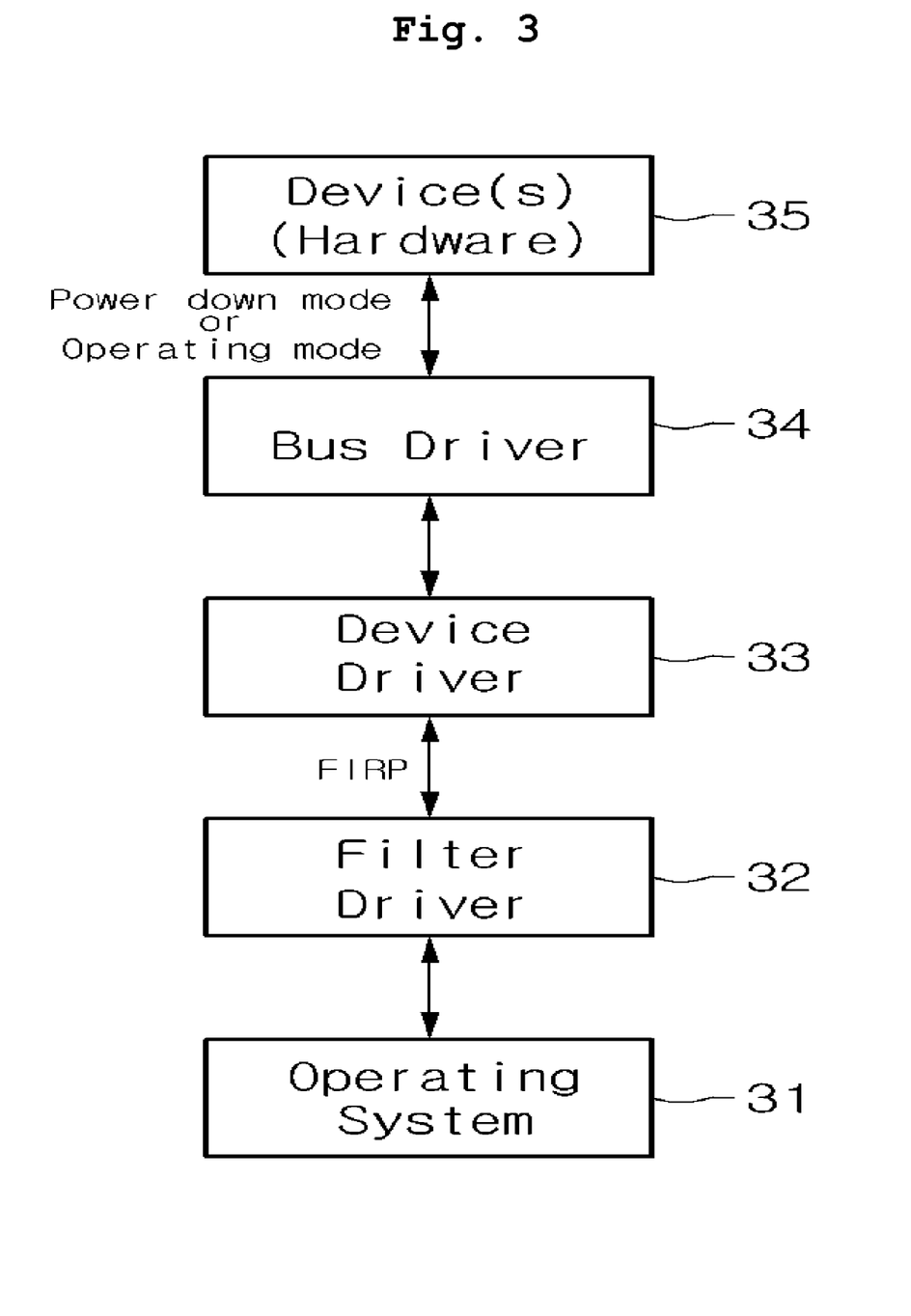
FIG. 3 is a block diagram of an exemplary power management apparatus of a computer system.

Referring to FIG. 3, a computer system includes an operating system 31, a filter driver 32, a device driver 33, a bus driver 34, and a device 35. The filter driver 32 provides an extension function that can add or modify a function of the device driver 33. At least one filter driver 32 is installed in a driver stack and extends the function of the device driver 33.

For example, if the system power mode determined by the operating system 31 is the operating mode, the additional filter driver 32 provided to the upper level of the device driver 33 transmits information relating to the operating mode to the device driver 33. Also, the filter driver 32 includes a data relay function for transmitting data, which is generated from the device 35 and received through the device driver 33, to the operating system 31.

Figure 4:
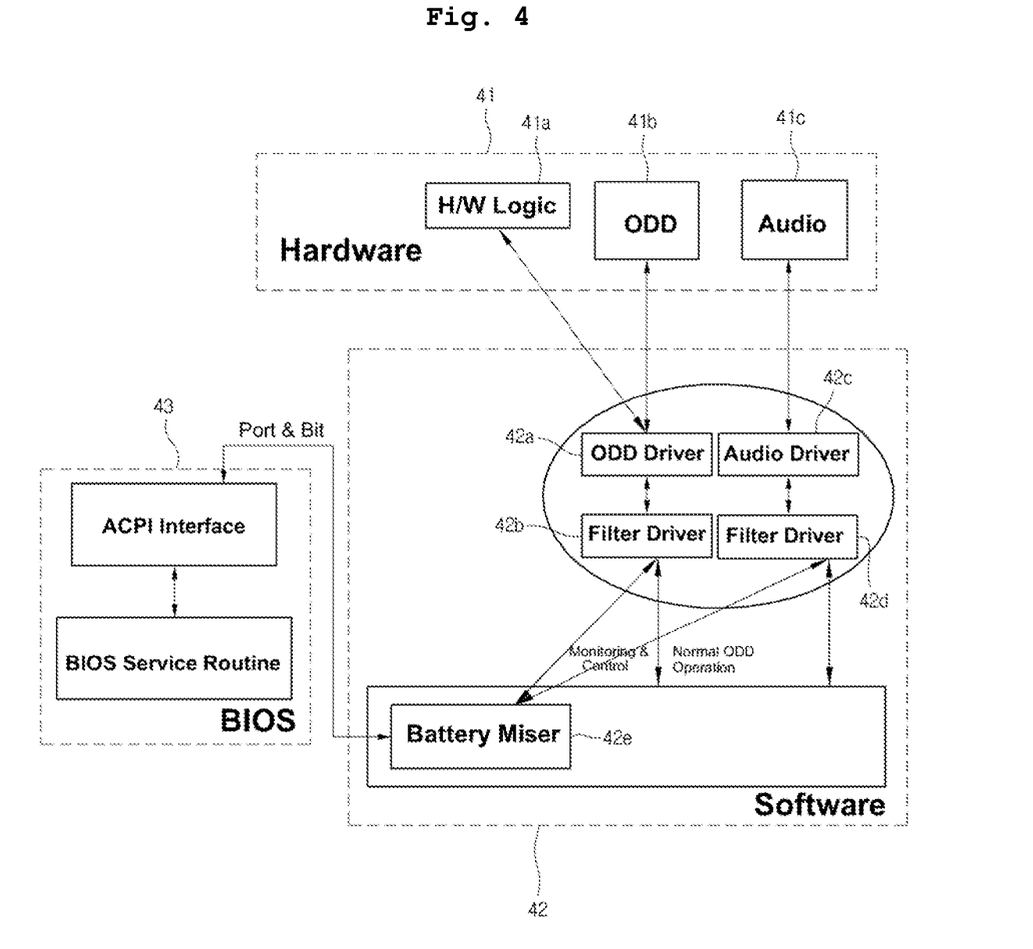
FIG. 4 is a block diagram of a filter driver that links information between an ODD driver and an application for providing power-saving features of a computer.

Referring to FIG. 4, a hooking operation of a filter driver 42*b* includes the hooking of information between an ODD driver 42*a* and a battery miser 42*e* that manages the system power. A hardware part 41 includes hardware (H/W) logic 41*a*, an ODD 41*b*, and an audio component 41*c*. Software 42 includes an ODD driver 42*a* and an audio driver 42*c* are driven corresponding to the ODD 41*b* and the audio component 41*c*, respectively. Filter drivers 42*b* and 42*d* are configured corresponding to the respective drivers, and hook the messages between the battery miser 42*e* and the respective drivers. Also, the BIOS 43 is provided, and includes an ACPI interface and a BIOS service routine.

Figure 5:
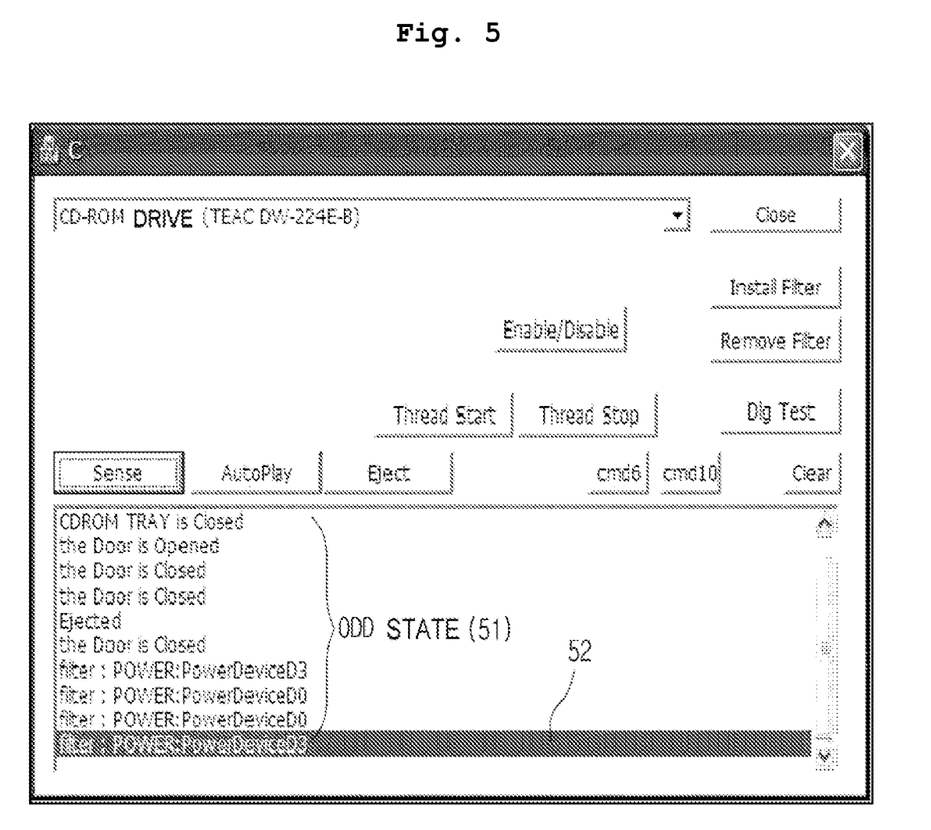
FIG. 5 is a diagram illustrating an example of a state of an ODD.

Referring to FIG. 5, various ODD states 51 are displayed in an exemplary screenshot. If the ODD 221 is idle for more than a predetermined time, the filter driver changes the ODD power state 52 from D0 to D3.

Figure 6:
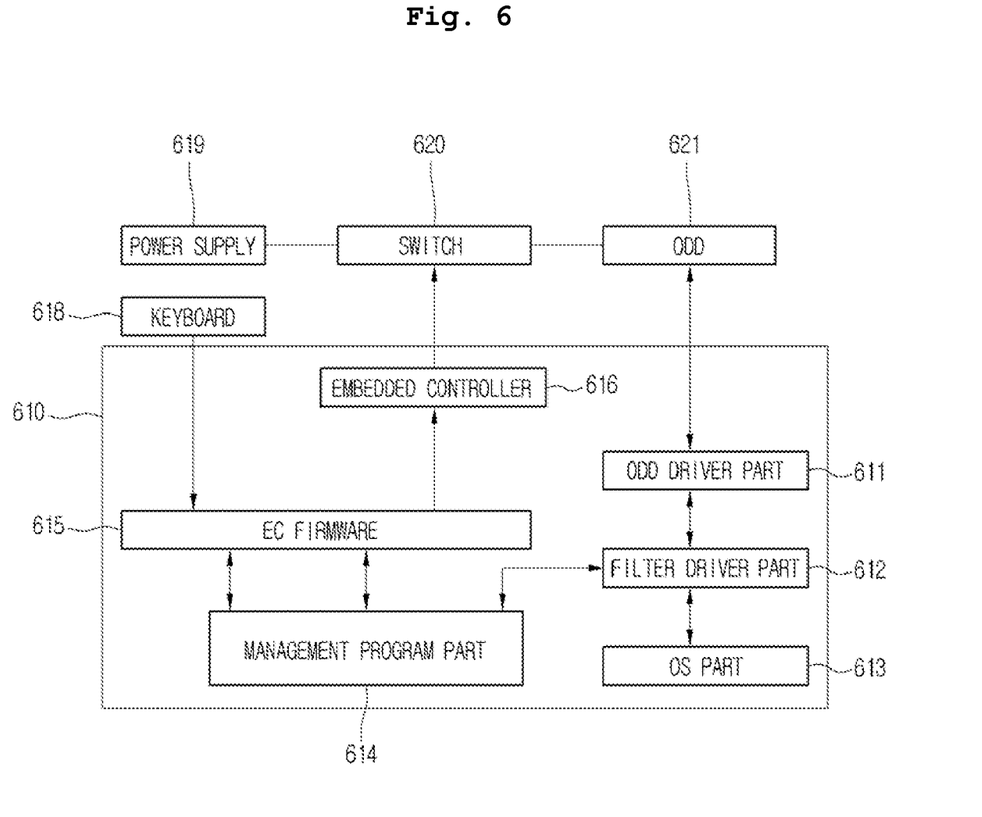
FIG. 6 is a block diagram of an apparatus for controlling the power supply of an ODD.

Referring to FIG. 6, an ODD 621, a power supply 619 and a keyboard 618 have the same general structure and operation as that of FIG. 2. A computer system 610 controls a switch 620 through an embedded controller 616. The computer system 610 includes an ODD driver 611, a filter driver 612, an OS part 613, and a management program part 614. Also, an EC firmware part 615 detects an input of a hotkey of the keyboard 618, and outputs control information for controlling the switch 620. An embedded controller 616 controls the switch 620. Accordingly, the system in FIG. 6 operates in the same manner as the system of FIG. 2, with the exception that the embedded controller 616 controls the switch 620 through the EC firmware part 615.

Figure 7:
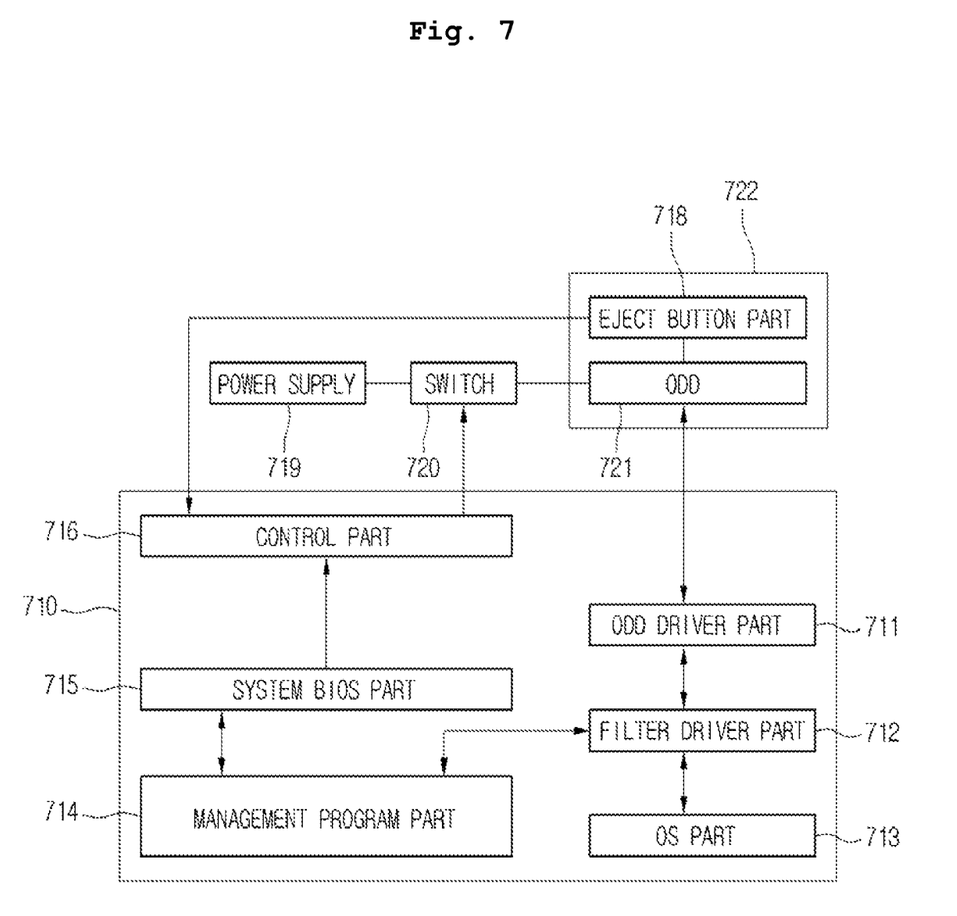
FIG. 7 is a block diagram of an apparatus for controlling the power supply of an ODD.

Referring to FIG. 7, an alternative system includes an ODD 721, a switch 720, and a power supply 719 having the same general structure as that shown in FIG. 2 and FIG. 6. However, an eject button part 718 is additionally provided for restarting the ODD 721 after the ODD 721 powers down. The switch 720 is controlled through a system BIOS part 715 and a control part 716. The eject button part 718 of the ODD 721 is used to close and open a tray (not shown) of the ODD 721.

If the eject button part 718 is pressed when the ODD 721 is in a power down state, a signal is generated without pressing a hotkey and the signal is input to the control part 716. The switch is connected and power is supplied to the ODD 721. The signal generated when the eject button part 718 is pressed in the power down state is supplied to the control part 716. The control part 716 notifies the management program part 714 through the system BIOS part 715 that the user wants to use the ODD 721. Simultaneously, the control part 716 controls the switch 720 to supply the power.

The management program part 714 receives the information from the system BIOS part 715, and transmits the eject command to the filter driver 712 that communicates with the OS part 713, such that the ODD driver part 711 opens the tray (not shown) of the ODD 721. The ODD 721 is supplied with power according to the operation of the switch 720 and is initialized. The ODD 721 receives the eject command from the ODD driver 711 and the tray is automatically opened according to the eject command.

The computer systems 210, 610 and 710 are differently configured according to whether the switches 222, 620 and 720 contacting the ODD are controlled by the controllers 216 and 716 (e.g., the south bridge or hub chipset) or the embedded controller 616. Accordingly, the monitoring of the ODD, the shutting off of power to the ODD, and the method of restarting the ODD may differ between the systems 210, 610 and 710.

The computer systems 210, 610 and 710 are differently configured according to whether the powered-down ODDs 221 and 621 are restarted using the hotkey or the eject button part 718 of the ODD part 722.

Figure 8:
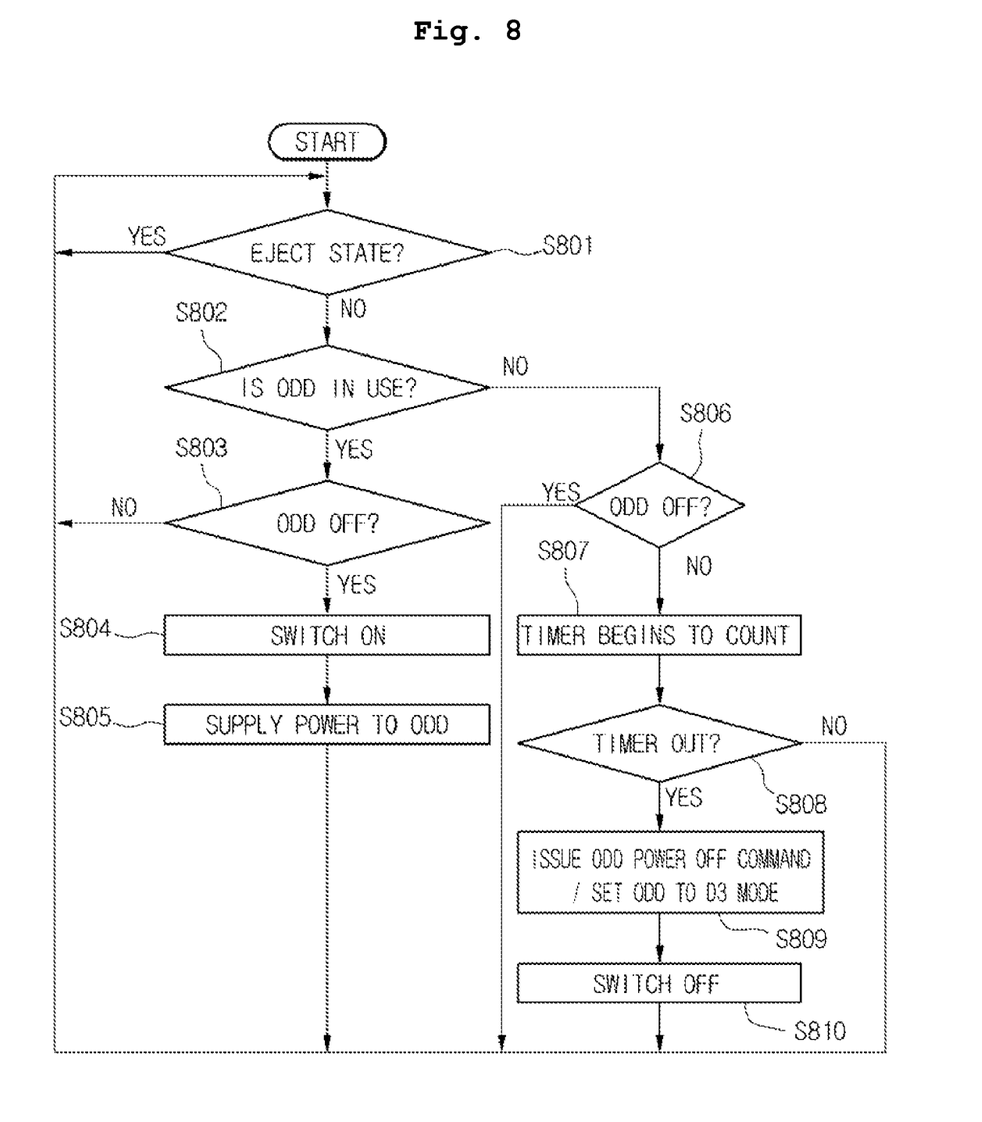
FIG. 8 is a flowchart of a process for controlling the power of an ODD.

Referring to FIG. 8, a process for controlling the power of an ODD in association with the systems shown in either of FIGS. 2 and 6 determines whether the tray of the current ODD is opened (i.e., in the eject state) (S801). If the tray is not in the eject state, a determination is made as to whether the ODD is being used (S802). Alternatively, the use of the ODD can be ascertained by requesting an indication of the ODD status from the computer system. For example, an indication of the use or state of the ODD may be requested from the computer system and may be obtained with a file explorer reading the information from the ODD.

If the ODD is not being used, the system determines if the ODD is in an off state D3 (S806). If the ODD is not in the off state, the timer starts a counting operation (S807). In order to determine whether the ODD is idle for a predetermined time period, the timer performs the counting operation for the predetermined time. If the timer is out (S808), the ODD is not being used for the predetermined time, and the system BIOS or EC firmware part issues the power-off command (S809), and the control part or the embedded controller turns off the switch, thereby cutting off the power (S810). However, before the power is cut off by the power-off command, the ODD power state may be set to the power-down state so that the OS cannot execute the polling operation. Also, the OS allows the ODD to be recognized as being operatively connected to the system (S809).

If the ODD is being used or is requested in operation S802, the system determines whether the current ODD is off (S803). If the ODD is off, the management program part enables the control part or the embedded controller to turn on the switch through the system BIOS part or the EC firmware part (S804), and power is supplied to the ODD (S805). Accordingly, the computer system performs the power control of the ODD in the above-described manner.

Figure 9:
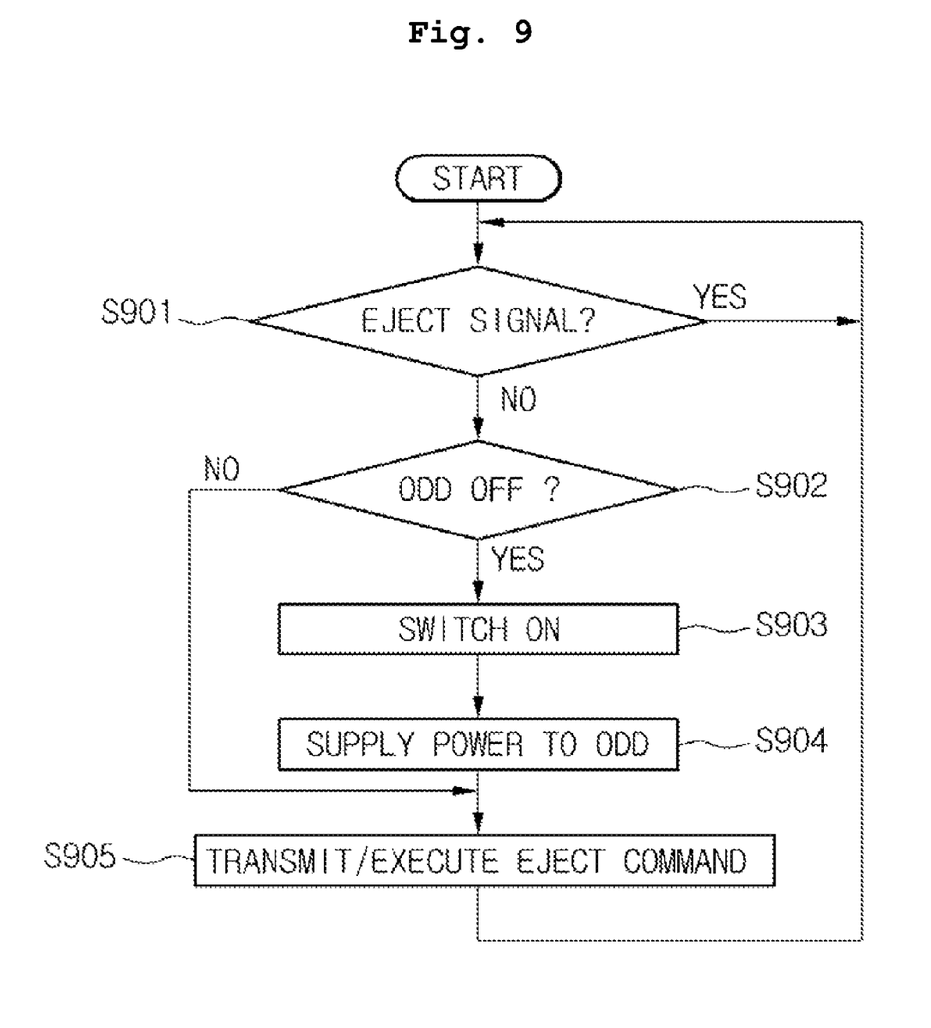
FIG. 9 is a flowchart of an eject operation of an ODD in association with the apparatus of FIG. 7.

The ODD may perform an eject operation in response to an input of the keyboard or the eject button part of the ODD. Referring to FIG. 9, the eject signal for an ODD in the system of FIG. 7 is processed as follows. First, if the user of the computer system wants to use the ODD, the eject signal is transmitted to the computer system by pressing the hotkey(s) defined in the keyboard or the eject button part of the ODD to eject the tray.

The computer system monitors whether the eject signal is input by the user (S901). If the eject signal is input, the management program part receives the ODD state information from the filter driver and determines whether the ODD is in the off state (S902). If the ODD is not in the off state, the management program part transmits the eject command to the ODD driver so that the tray of the ODD is ejected (S905).

In contrast, if the ODD is in the off state, the switch is turned on (S903) to supply the power to the ODD (S904), and the eject command is transmitted and executed (S905) by the system. The switching-on operation S903 and the power supplying operation S904 are substantially similar to the operations S805 and S806 of FIG. 8, respectively. Therefore, even if the ODD is off, the ODD can be operated by a selection of the eject signal.

Figure 10:
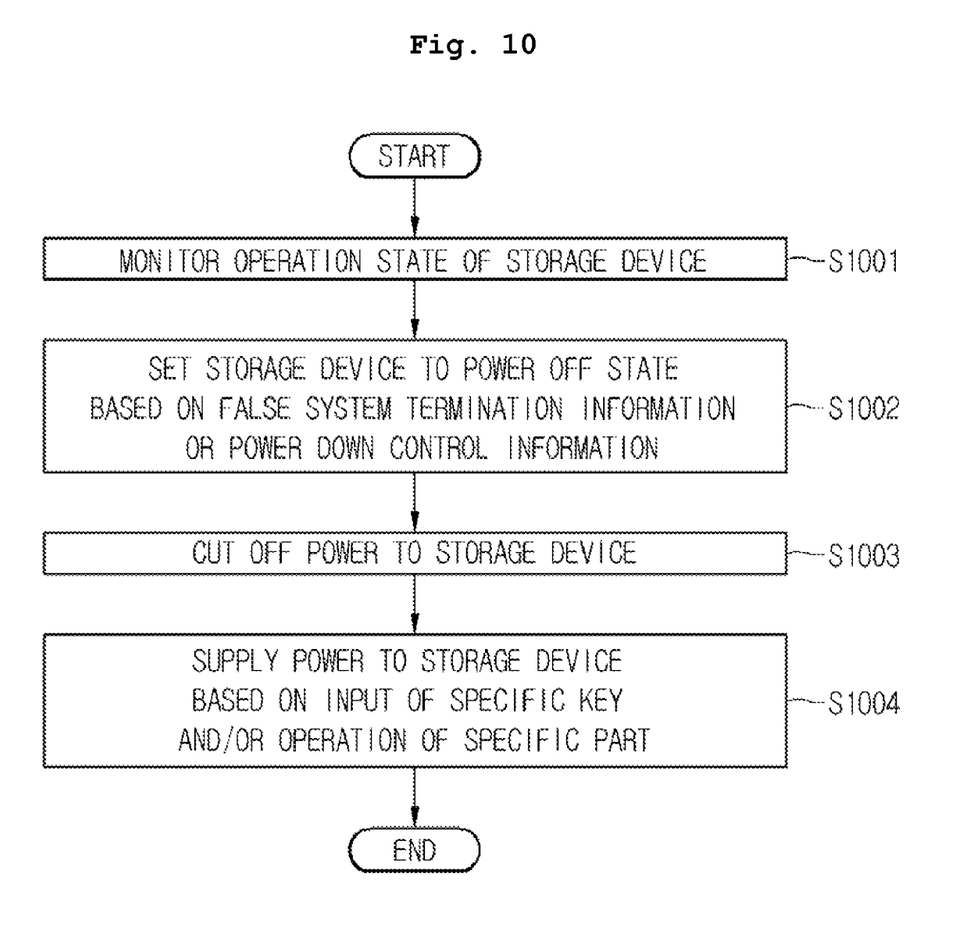
FIG. 10 is a flowchart of an apparatus for controlling the power of a storage device.

Referring to FIG. 10, an exemplary process for controlling the power of a storage device includes having the filter driver monitor and determine the operation state of the storage device by hooking the information between the OS and the storage device (ODD) driver (S1001). If the ODD is idle for more than a predetermined time, the management program part outputs the power switch off command to the control part so as to cut off the ODD power. In addition, information is output to the ODD driver part to set the ODD power state to D3 (S1002).

Accordingly, the management program part outputs a false indication of system termination in order for the ODD not to operate the ODD, and/or applies power down control information so that the ODD is set to the D3 mode. The switch is then turned off and the storage device is powered down (S1003).

In order to reuse or restart the ODD, a user presses the predetermined specific key (hotkey), the combination of the existing keys, and/or the eject button part (S1004). In response to the action of the user, the power is supplied to the ODD. If the storage device is idle for more than a predetermined time, the ODD is powered down. However, before the storage device is powered down, the power state of the storage device is set to the off state (D3) so that the storage device can still be recognized as being operatively connected to the system. Accordingly, the OS does not perform the polling operation for the detection of the storage device.

If the input of the specific key, the combination of the existing keys, the activation of the eject key of the storage device, and/or the operation of the tray is detected, the storage device can be supplied with power and used again. If the ODD is connected to the system and is idle for more than a predetermined time period, the ODD is powered down. Therefore, the power typically used to maintain a storage device, such as an ODD, in a standby mode, e.g., a reduced power mode, is saved. In addition, the lifespan of the battery can be extended, the power requirements of the system can be reduced, and/or the system power can be used more efficiently.

Further, the power may be supplied based on the input of the specific key(s) or the operation of the specific part and therefore the ODD can be restarted.

Exemplary code for registering a monitoring routine for a filter driver is shown in Table I.

TABLE I

```
** INSERTION OF MONITORING FILTER DRIVER INTO ODD DRIVER
extern "C" NTSTATUS DriverEntry(IN PDRIVER_OBJECT DriverObject, IN
PUNICODE_STRING RegistryPath)
{LONG i; NTSTATUS status = STATUS_SUCCESS;ANSI_STRING registry_path;
 for (i = 0; i < IRP_MJ_MAXIMUM_FUNCTION; i++ ) DriverObject-
 >MajorFunction[i] = ptdDispatchGeneral;
// REGISTRATION OF MONITORING ROUTINE
     DriverObject->DriverExtension->AddDevice = ptdAddDevice;
     DriverObject->DriverUnload = ptdUnload;
     DriverObject->MajorFunction[IRP_MJ_POWER] = ptdDispatchGeneral;
     DriverObject->MajorFunction[IRP_MJ_PNP] = ptdDispatchGeneral;
     DriverObject->MajorFunction[IRP_MJ_CREATE]      =
     DriverObject->MajorFunction[IRP_MJ_CLOSE] =
     DriverObject->MajorFunction[IRP_MJ_CLEANUP]     =
ptdDispatchGeneral; DriverObject->MajorFunction[IRP_MJ_DEVICE_CONTROL]
= ptdDispatchGeneral;
return status;}
```

Exemplary code for a timer setting routine for a filter driver that permits the timer setting routine to power down an ODD is shown in Table II. Exemplary code for a monitoring routine for a filter driver, where the monitoring routine monitors a state of an ODD through information between an ODD driver and an OS is shown in Table III.

TABLE II

```
// TIMER SETTING ROUTINE
// ROUTINE FOR GENERATING POWER DOWN IRP WHEN DATA IS NOT
TRANSMITTED TO ODD WITHIN PREDETERMINED TIME.
VOID PM_Disable(PDEVICE_EXTENSION pdx, BOOLEAN disable)
{if (disable) {pdx->idlecount=PoRegisterDeviceForIdleDetection(pdx->fido,0,0,
PowerDeviceD0);current_pm_state=CURRENT_POWER_OFF; } else {if
(ac_or_battery==PTD_ON_AC)
    pdx->idlecount=PoRegisterDeviceForIdleDetection(pdx->fido,iplug,
iplug, istate); else pdx->idlecount=PoRegisterDeviceForIdleDetection(pdx-
>fido,iunplug, iunplug, istate); current_pm_state=CURRENT_POWER_ON;}
}
// PoRegisterDeviceForIdleDetection
FUNCTION FOR GENERATING POWER DOWN IRP WHEN TIMER IS NOT RESET
FOR TIME SET BY FUNCTION.
```

TABLE III

```
// MONITORING ROUTINE
THIS ROUTINE IS CALLED WHEN DATA TRANSMISSION IS ACHIEVED, AND
RESETS TIMER SUCH THAT POWER OF ODD IS NOT DOWN. IF THE DATA
TRANSMISSION IS NOT ACHIEVED FOR A PREDETERMINED TIME, IT BECOMES
TIMEOUT SO THAT POWER OF ODD IS DOWN.
NTSTATUS ptdDispatchGeneral(IN PDEVICE_OBJECT fido, IN PIPR Irp )
{PDEVICE_EXTENSION pdx = (PDEVICE_EXTENSION) fido->DeviceExtension;
    PIO_STACK_LOCATION stack = IoGetCurrentIrpStackLocation(Irp);
    UCHAR type = stack->MajorFunction;
    SetBusy(pdx); // Reset Timer so that ODD Power can not Down
    // Pass the IRP to the target without touching the IRP
    IoSkipCurrentIrpStackLocation(Irp) ;
    return IoCallDriver(pdx->LowerDeviceObject, Irp);}
```

An exemplary routine for resetting a timer routine is shown in Table IV.

TABLE IV

```
// Function for resetting Timer
Let Power on and reset timer when the state of power is Down.
VOID SetBusy(PDEVICE_EXTENSION pdx)
{NTSTATUS status;
if (pdx->idlecount) PoSetDeviceBusy(pdx->idlecount);
if (pdx->curstate>PowerDeviceD0 && pdx->systemstate ==
PowerSystemWorking)
{if (current_pm_state==CURRENT_POWER_OFF)
{current_pm_state=CURRENT_TIMER_STARTED;}
SendDevicePowerIRP(pdx->pdo, PowerDeviceD0);
SendDevicePowerIRP(pdx->pdo, PowerDeviceD0);
}
    }
```

It will be apparent that various modifications and variations can be made. Accordingly, other implementations are within the scope of the following claims.

What is claimed is:

1. An apparatus for controlling power of a storage device, comprising:
    a power supply;
    an optical disk device (ODD) driver configured to control an operation of an optical disk device;
    a switch connected between the power supply and the optical disk device driver, the switch being turned on in response to a control signal to thereby perform on operation of the power supplied to the ODD driver; and
    a management program part configured to perform power control operations for multiple devices of a computer including the optical disk device, the power control operations comprising:
        when a monitored state of the optical disk device reveals that the optical disk device has been idle for more than a predetermined time period, controlling the switch to turn off power to the optical disk device while maintaining power to at least one of the multiple devices of the computer, and
        in response to receiving input of a predetermined key associated with controlling a function performed by the optical disk device after turning off power to the optical disk device, controlling the switch to supply power to the optical disk device and determining to maintain a power state of at least one of the multiple devices of the computer.

2. The apparatus according to claim 1, further comprising an eject button part configured to output an interrupt signal to supply power to the optical disk device in a power-off state.

3. The apparatus according to claim 1, further comprising:
    a filter driver connected to the ODD driver and an operating system and the filter driver configured to monitor the state of the optical disk device; and
    a management program unit configured to output a control command to be input to a control unit so as to control the power according to the monitored state of the optical disk device.

4. The apparatus according to claim 1, wherein power state of the optical disk device is set to a power-off state before the power of the optical disk device is cut off.

5. The apparatus according to claim 3, wherein the filter driver is configured to transmit information indicative of system termination or a power-off state of the ODD driver of the optical disk device.

6. The apparatus according to claim 3, wherein the filter driver is configured to output mode information of the optical disk device, and wherein the operating system is configured to recognize the optical disk device as being in an idle state in response to the mode information.

7. The apparatus according to claim 1, wherein controlling the switch to supply power to the optical disk device and determining to maintain the power state of at least one of the multiple devices of the computer comprises controlling the switch to supply power to the optical disk device and determining to maintain at least one of the multiple devices of the computer in a power off state.

8. The apparatus according to claim 1, wherein receiving input of the predetermined key associated with controlling the function performed by the optical disk device comprises receiving input of an eject key that controls an ejection operation performed by the optical disk device.

* * * * *